(12) United States Patent
Halupka et al.

(10) Patent No.: US 10,704,994 B2
(45) Date of Patent: Jul. 7, 2020

(54) APPARATUS FOR AUTOMATIC SEPARATION AND COLLECTION OF FLUID

(71) Applicant: International Business Machines Corporation, Armonk, NY (US)

(72) Inventors: Kerry J. Halupka, Northcote (AU); Stefan von Cavallar, Sandringham (AU); Rajib Chakravorty, Epping (AU); Suman Sedai, Hughesdale (AU); Rahil Garnavi, Macleod (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/188,895

(22) Filed: Nov. 13, 2018

(65) Prior Publication Data

US 2020/0150000 A1    May 14, 2020

(51) Int. Cl.
   *G01N 1/20*    (2006.01)
(52) U.S. Cl.
   CPC ... *G01N 1/2035* (2013.01); *G01N 2001/2071* (2013.01)
(58) Field of Classification Search
   CPC .. G01N 1/18; G01N 1/2035; G01N 2001/205; G01N 2001/2057; G01N 2001/2071; B01L 3/502
   See application file for complete search history.

(56) References Cited

U.S. PATENT DOCUMENTS 2,818,733 A * 1/1958 Stanley, Jr. ............ G01N 1/18
                                                        73/426
2,884,021 A * 4/1959 Ginsburg ................ G01N 1/18
                                                        141/35
(Continued)

FOREIGN PATENT DOCUMENTS

WO         91/01120 A1    2/1991
WO      2010058210 A1    5/2010
(Continued)

OTHER PUBLICATIONS

Mangin, Derelie, et al. "Chlamydia trachomatis testing sensitivity in midstream compared with first-void urine specimens." The Annals of Family Medicine 10.1 (2012): 50-53. [2] Delanghe, Joris, and Marijn Speeckaert. "Preanalytical requirements of urinalysis." Biochemia medica: Biochemia medica 24.1 (2014): 89-104.
(Continued)

*Primary Examiner* — Justin N Olamit
(74) *Attorney, Agent, or Firm* — Scully, Scott, Murphy & Presser, PC; Joseph Petrokaitis, Esq.

(57) ABSTRACT

An apparatus for the collection of multiple samples of a fluid stream. The apparatus includes a plurality fluid collection containers arranged to receive separate portions of the fluid stream in a temporal sequence and a sealing mechanism provided on each fluid collection container configured to close the fluid collection containers when filled by a portion of the fluid stream and to cause the fluid stream to flow to the next fluid collection container in the sequence. The fluid collection containers separately collect at least a beginning portion of the fluid stream, a mid-portion of the fluid stream and an end-portion of the fluid stream. Each of the fluid collection containers may be detachably connected to tubing held in a housing having a sloped upper surface for receiving the fluid stream and an inlet for directing the fluid stream to the tubing. The housing may be a fluid collection cup.

16 Claims, 3 Drawing Sheets

(56) References Cited

U.S. PATENT DOCUMENTS

| | | | |
|---|---|---|---|
| 3,750,648 A | 8/1973 | Gleason et al. | |
| 3,982,898 A | 9/1976 | McDonald | |
| 4,457,314 A | 7/1984 | Knowles | |
| 4,492,258 A | 1/1985 | Lichtenstein et al. | |
| 4,981,144 A | 1/1991 | Carels, Jr. | |
| 6,976,398 B2* | 12/2005 | Leoncavallo | G01N 1/12 73/863.52 |
| 7,461,671 B2* | 12/2008 | Ehwald | B01L 3/502738 141/198 |
| 9,968,336 B2* | 5/2018 | Van Damme | A61B 5/14507 |
| 10,034,659 B2 | 7/2018 | Gonzalez et al. | |
| 2011/0178425 A1 | 7/2011 | Nishtala et al. | |
| 2015/0157300 A1 | 6/2015 | Ealovega et al. | |
| 2015/0351728 A1 | 12/2015 | Stewart | |
| 2017/0196478 A1 | 7/2017 | Hunter | |
| 2017/0333672 A1 | 11/2017 | Erbey, II et al. | |
| 2018/0125697 A1 | 5/2018 | Ferrera | |
| 2018/0177458 A1 | 6/2018 | Burnett et al. | |
| 2018/0214297 A1 | 8/2018 | Hughett et al. | |

FOREIGN PATENT DOCUMENTS

| | | |
|---|---|---|
| WO | 2011110469 A1 | 9/2011 |
| WO | 2017078493 A1 | 5/2017 |

OTHER PUBLICATIONS http://www.Ipitaliana.com/en/news/2/patented-urine-sample-container-for-testing-drugs-of-abuse.html Patented container (European Patent Appl. EP 10425062.6) with 4 separate compartments of 35 ml each. the division may not be according to flow, May 7, 2016.

Delanghe, et al., "Preanalytical requirements of urinalysis", Biochemia Medica 2014;24(1):89-104, Sep. 30, 2013, pp. 90-104, http://dx.doi.org/10.11613/BM.2014.011.

Nabavizadeh et al., "A New Method to Make 24-Hour Urine Collection More Convenient: A Validity Study", Hindawi Publishing Corporation, International Journal of Nephrology, vol. 2014, Apr. 29, 2014, pp. 1-5, http://dx.doi.org/10.1155/2014/718147.

List of IBM Patents or Patent Applications Treated As Related dated Nov. 13, 2018, pp. 2.

Continence NZ, "Bladder Retraining", Feb. 8, 2013, pp. 1-7, https://www.continence.org.nz/pages/Bladder-Retraining/48/.

Mangin, Derelie, et al. "Chlamydia trachomatis testing sensitivity in midstream compared with first-void urine specimens." The Annals of Family Medicine 10.1 (2012): 50-53.

* cited by examiner

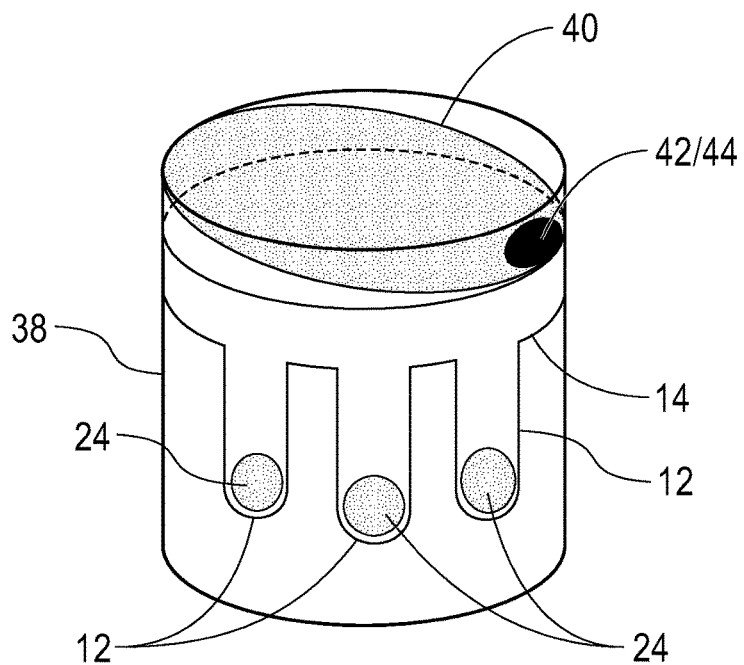
FIG. 3A
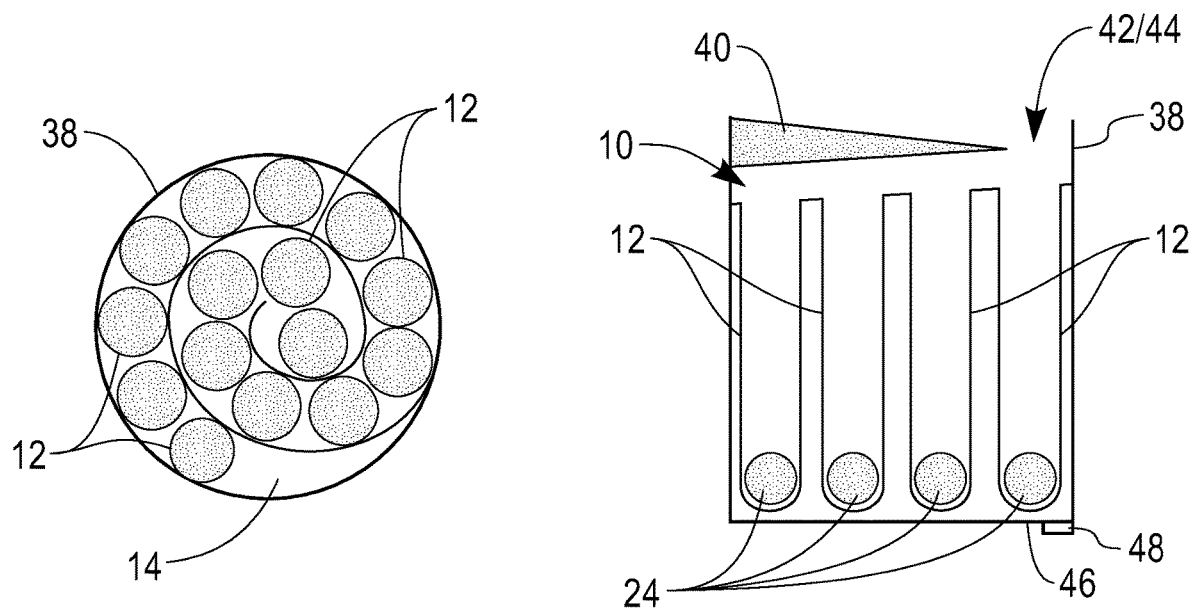
FIG. 3B
FIG. 3C

APPARATUS FOR AUTOMATIC SEPARATION AND COLLECTION OF FLUID

BACKGROUND OF THE INVENTION

This disclosure is directed to fluid sampling and more particularly, to an apparatus and method to automatically separate and collect multiple samples of a fluid.

There is often a need to separate particular portions of a fluid stream, such as for, for example, when a specific type of test is required for a particular portion of the stream.

For example, petrochemical testing may involve collecting multiple samples for testing, but handling multiple sample collection tubes can be difficult and spills can be dangerous. In another example, water testing may involve collecting a series of samples so that changes in the properties of the water (e.g., salinity) over time can be measured. In another example, urinalysis may involve collecting a first-void portion for testing related to certain health conditions and a mid-stream portion for testing related to other health conditions. Manual collection for urinalysis, such as using a plastic cup, is unhygienic, inconvenient, and can be challenging, particularly for young patients, elderly patients, or those with mobility constraints, which may result in testing inaccuracies.

SUMMARY OF THE INVENTION

In one embodiment, this disclosure is directed to an apparatus for the collection of multiple samples of a fluid stream. In one embodiment, the apparatus includes a plurality fluid collection containers arranged to receive separate portions of the fluid stream in a temporal sequence and a sealing mechanism provided on each fluid collection container. Each sealing mechanism is configured to close a respective fluid collection container when filled by a portion of the fluid stream and to cause the fluid stream to flow to the next fluid collection container in the sequence. The plurality of fluid collection containers are arranged to separately collect at least a beginning portion of the fluid stream, a mid-portion of the fluid stream and an end-portion of the fluid stream.

In one embodiment, the apparatus includes a tubing configured to receive the fluid stream. The tubing has a plurality of connection ports and each of the fluid collection containers are detachably connectable to a respective one of the tubing connection ports. In one embodiment, the apparatus includes a housing configured to hold the tubing with the plurality of connection ports and the detachably connected fluid collection containers. The housing has a sloped upper surface for receiving the fluid stream and an inlet for directing the fluid stream to the tubing. In one embodiment, the housing is a collection cup and the tubing is arranged in a spiral within the collection cup such that each fluid collection container is sequentially lower than the previous fluid collection container.

In one embodiment, the disclosure is directed to a method of collection of multiple samples of a fluid stream, including collecting a fluid stream in a plurality fluid collection containers arranged to receive separate portions of the fluid stream in a temporal sequence, closing each fluid collection container when filled by a portion of the fluid stream, causing the fluid stream to flow to the next fluid collection container in the sequence after the previous fluid collection container is filled and separately collecting at least a beginning portion of the fluid stream, a mid-portion of the fluid stream and an end-portion of the fluid stream in a respective at least one fluid collection container. In one embodiment, the method includes locking the top of the filled fluid collection containers to prevent fluid from escaping from the top of the fluid collection containers. In one embodiment, the method includes collecting a beginning portion of the fluid stream in a plurality of fluid collection containers, collecting a mid-portion of the fluid stream in a plurality of fluid collection containers and collecting an end-portion of the fluid stream in a plurality of fluid collection containers.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3A is an isometric view of one embodiment of the apparatus disclosed in this specification showing a collection housing.

FIG. 3B is a top view of the apparatus and collection housing of FIG. 3A.

FIG. 3C is side elevational view of the apparatus and collection housing of FIG. 3A.

DETAILED DESCRIPTION OF PREFERRED EMBODIMENTS

In one embodiment, this disclosure is directed to an apparatus and method for the collection of multiple samples of a fluid stream that automatically separates the fluid stream into multiple discrete containers. In one embodiment, the apparatus includes a plurality fluid collection containers arranged to receive separate portions of the fluid stream in a temporal sequence and a sealing mechanism provided on each fluid collection container. Each sealing mechanism is configured to close a respective fluid collection container when filled by a portion of the fluid stream and to cause the fluid stream to flow to the next fluid collection container in the sequence. The plurality of fluid collection containers are arranged to separately collect at least a beginning portion of the fluid stream, a mid-portion of the fluid stream and an end-portion of the fluid stream.

Figure 1:
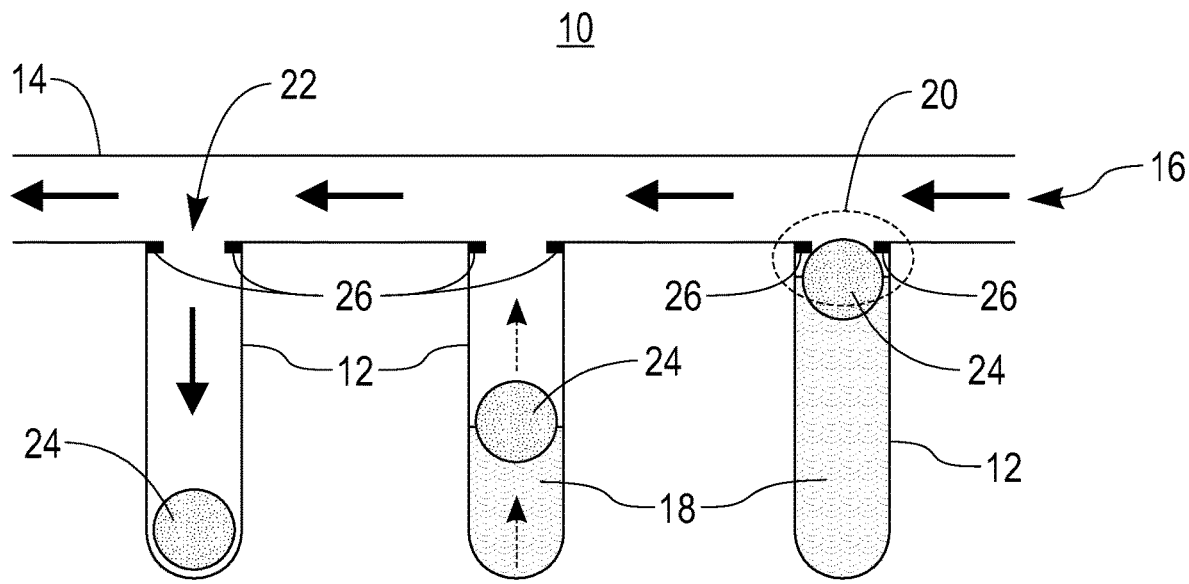
FIG. 1 is an elevational view of one embodiment of the apparatus disclosed in this specification showing multiple fluid connection containers.

In one embodiment the apparatus is configured for the collection of portions of a fluid stream, which allows a user to capture the entire flow of the fluid stream without worry about capturing a specific portion. In one embodiment, as shown in FIG. 1, the apparatus 10 includes a plurality of containers 12 arrayed along the length of a tube 14. The containers 12 closest to the inlet 16 of the tube 14 is the first to be filled with fluid 18, owing to the fluid reaching that container 12 first. When the fluid 18 fills the first container 12, a sealing mechanism 20 at the top of each container 12 closes the container inlet 22. In one embodiment the sealing mechanism 20 is composed of a buoyant ball 24 that is sufficiently buoyant to float in the fluid being sampled. The ball 24 will float on the top of the fluid 18 as the fluid fills the container 12. When the container 12 is full, the ball 24 presses against a flexible seal 26 located at the inlet 22, effectively closing the container 12. Once a container 12 is full and sealed, the fluid flows over the sealing mechanism 20 and on to the next container 12.

Figure 2:
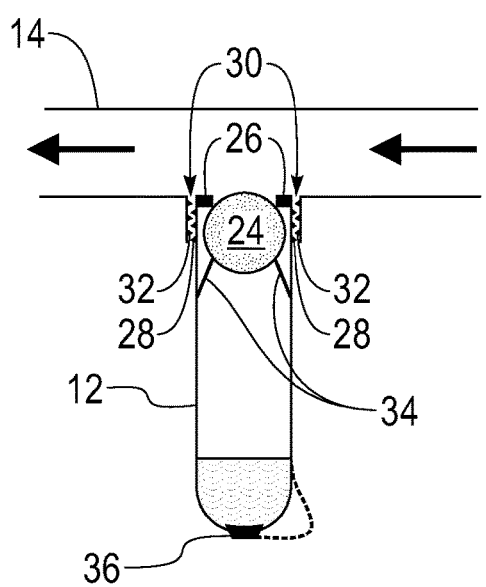
FIG. 2 is an elevational view of one embodiment of the apparatus disclosed in this specification showing details of a fluid connection container disclosed in this specification.

In one embodiment, as shown in FIG. 2, each container 12 has threads 28 to connect to a connection port 30 on tube 14. The threads 28 can also mate with a screw top (not shown) for the container 12 when the container 12 is disconnected from the tube 14. Tube 14 will have a plurality of the connection ports 30 for connecting a plurality of the fluid collection containers 12. The connection port 30 has threads 32 that mate with the threads 28 to form a water tight seal to prevent leakage. The flexible seal 26, which may be a rubber bumper-seal, is positioned inside the top of the container 12 to prevent ball 24 from rising further. A locking device 34, such as a flexible flange, is positioned at a point on the inside of the container 12 below ball 24 when the ball is pressed against the seal 26 to impede movement of the ball in a direction away from the top edge, thereby preventing the ball 24 from dropping. The combination of the seal 26 and the locking device 34 completely locks the inlet to each tube 12 once it is filled so that movement of the container 12 after fluid collection does not result in mixing of the fluid in different containers 12. The containers 12 may have a plug seal 36 at the base of container 12 to allow easy removal of the fluid for analysis.

In one embodiment, the fluid collection containers are arranged in a housing. As shown in FIGS. 3A, 3B, and 3C, the housing may be a cup 38 with a built-in apparatus 10 to separate fluid stream into multiple containers 12 based on the temporal phase of the stream. In one embodiment, the collection cup 38 includes a sloped upper surface 40 for receiving the fluid stream as shown in FIGS. 3A and 3C. The upper surface 40 guides the stream to an outlet 42 that mates with inlet 44 of the collection tube 14. The tube 14 then guides the fluid into each container 12. The housing 38 includes the ability of access the each of the fluid containers 12. In one embodiment, the bottom wall 46 of container 38 is configured to swing open, enabling the plugs 36 on the bottom of each fluid container 12 to be accessed and/or the containers 12 to be removed. A screw latch 48 or other locking mechanism is provided for opening and closing the bottom wall. Alternatively, the fluid containers 12, spiral tubing 14 and sloped upped surface 40 are configured as a separate unit that can be lifted out of the top of container 38 in order to access the fluid containers 12.

In one embodiment, containers 12 are arrayed in a spiral fashion within the collection cup 38, as shown in FIG. 3B. The tube 14 starts to collect the fluid at the outside of the spiral, and guides fluid to each container 12 in turn, filling one before moving on to the next around the spiral. Although fifteen containers 12 are shown FIG. 3B, different embodiments of the design may include varying numbers and sizes of containers 12.

As described above, the apparatus 10 is configured for the collection of multiple samples of a fluid stream. The apparatus 10 includes a plurality fluid collection containers 12 arranged to receive separate portions of the fluid stream in a temporal sequence and a sealing mechanism formed by seal 26 and locking device 34 provided on each fluid collection container 12. Each sealing mechanism is configured to close a respective fluid collection container 12 when filled by a portion of the fluid stream and to cause the fluid stream to flow to the next fluid collection container 12 in the sequence. The plurality of fluid collection containers 12 are arranged to separately collect at least a beginning portion of the fluid stream, a mid-portion of the fluid stream and an end-portion of the fluid stream.

As described above, the apparatus 10 includes a tubing 14 configured to receive the fluid stream. The tubing 14 has a plurality of connection ports 30 and each of the fluid collection containers 12 are detachably connectable to a respective one of the tubing connection ports 30. In one embodiment, the apparatus 10 includes a housing 38 configured to hold the tubing 14 with the plurality of connection ports 30 and the detachably connected fluid collection containers 12. The housing 38 has a sloped upper surface 40 for receiving the fluid stream and an outlet 42 for directing the fluid stream to the tubing inlet 44. In one embodiment, the tubing 14 is arranged in a spiral within the collection cup 38 such that each fluid collection container 12 is sequentially lower than the previous fluid collection container 12.

In one embodiment, the housing 38 is a collection cup and the tubing 14 and fluid collection containers 12 are adapted to collect a flow of a fluid from a reservoir or other body of fluid. For example, the total volume of the reservoir may vary, but may be between 250-400 ml. Therefore, the number of containers 12 may be selected to cover the possible maximum of 400 ml and/or very close it. By using smaller containers 12, but more of them, the apparatus allows for the fluid to be further discretised. This means that even if the complete volume were to be less than the expected minimum (250 mL), the flow would still be separated sufficiently to reduce the chance of different phases mixing. Separated phases could then be independently analyzed by technicians. Further, the volume and number of the containers 12 can vary depending on different types of tests that need to be carried out. For example, some tests may need an array of small containers to collect only small amounts of fluid.

In addition, the apparatus 10 may be operated manually by a user during standard tests. For example, certain diagnostic tests may require analyzing a middle portion of a fluid stream. The user is provided with the apparatus 10 to collect a fluid sample. However, no special instruction about collecting the middle portion is necessary. The user passes fluid into the apparatus 10, without needing to move the container in or out of the flow, as would be required for such a collection without the apparatus 10. As the fluid flows into the apparatus 10, the sloped upper surface 40, as shown in FIGS. 3A and 3C, diverts the fluid to the outlet 42 connected to the inlet 44 of tube 14. The tube 14 diverts the fluid to flow into the first fluid collection container 12, causing the ball 24 to float upwards as the container 12 fills. The ball 24 pushes past the flexible locking device 34, shown in FIG. 2, and up against the seal 26, preventing the ball 24 from rising further. The seal 26 and locking device 34 prevent the ball from being dislodged with any movement of the cup 38. Once the container 12 is sealed, the fluid flows on toward the next container 12 in sequence. Thereafter, the above process is repeated for additional containers 12 connected to the tube 14, until the fluid flow has finished. The cup 38 is sized to contain enough containers 12 such that most fluid volumes are accommodated for, for example, based on an expected volume. Therefore, some or all of containers 12 will be filled during a single use, with the other containers 12 remaining completely or partially unfilled. The user screws a lid on to the cup 38 and returns the apparatus to the lab technician. The lab technician detaches the tubes 12 by unscrewing them from the tube 14.

The lab technician extracts fluid from only the containers relating to the required phase of the flow by unplugging the seal 36 at the base of the selected containers 12. For example, if 10 containers 12 are filled, containers 4-6 in the sequence relate to the midstream. All parts of the apparatus are sterilized and may then be used again.

Figure 4:
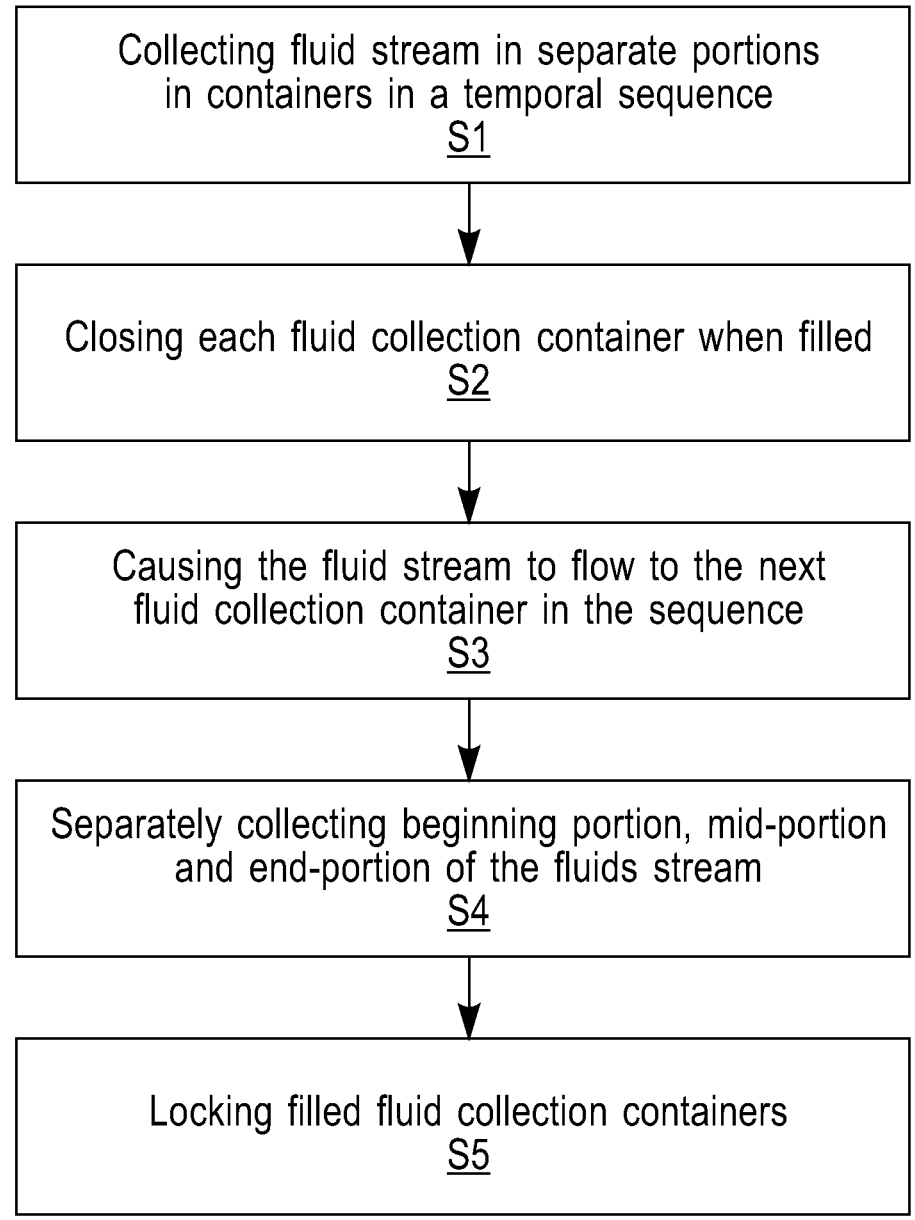
FIG. 4 is a flow diagram of one embodiment of the method disclosed in the specification.

In one embodiment, the disclosure is directed to a method of collection of multiple samples of a fluid stream. As shown in FIG. 4, the method includes step S1 of collecting a fluid stream in a plurality fluid collection containers arranged to receive separate portions of the fluid stream in a temporal sequence, step S2 of closing each fluid collection container when filled by a portion of the fluid stream, step S3 of causing the fluid stream to flow to the next fluid collection container in the sequence after the previous fluid collection container is filled and step S4 of separately collecting at least a beginning portion of the fluid stream, a mid-portion of the fluid stream and an end-portion of the fluid stream in a respective at least one fluid collection container. In one embodiment, the method may include step S5 of locking the top of the filled fluid collection containers to prevent fluid from escaping from the top of the fluid collection containers. In one embodiment, the method may further include collecting a beginning portion of the fluid stream in a plurality of fluid collection containers, collecting a mid-portion of the fluid stream in a plurality of fluid collection containers and collecting an end-portion of the fluid stream in a plurality of fluid collection containers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. An apparatus for collection of multiple samples of a fluid stream, the apparatus comprising:
   a plurality of fluid collection containers arranged to receive separate portions of the fluid stream in a temporal sequence;
   a seal mechanism provided on each fluid collection container, each seal being configured to close a respective fluid collection container when filled by a portion of the fluid stream and to cause the fluid stream to flow to the next fluid collection container in the sequence;
   a tubing configured to receive the fluid stream, the tubing having a plurality of connection ports, each of the fluid collection containers being detachably connectable to a respective one of the tubing connection ports; and
   a housing configured to hold the tubing having the plurality of connection ports, the housing having a sloped upper surface for receiving the fluid stream and an inlet for directing the fluid stream to the tubing;
   wherein the plurality of fluid collection containers are arranged to separately collect at least a beginning portion of the fluid stream, a mid-portion of the fluid stream and an end-portion of the fluid stream.

2. The apparatus of claim 1, wherein the housing is a fluid collection cup and the tubing is arranged in a spiral within the fluid collection cup such that each subsequent fluid collection container is sequentially lower than a previous fluid collection container.

3. The apparatus of claim 1, further including a lock to prevent fluid from escaping from the top of filled fluid collection containers.

4. The apparatus of claim 3, wherein the seal comprises a positively buoyant ball within the fluid collection container and a sealing material around a top edge of a wall inner surface of the fluid collection container, whereby the ball mates with the seal when the fluid stream fills the fluid collection container.

5. The apparatus of claim 4, wherein the lock comprises a flange that allows the ball to pass through when the fluid stream rises in the fluid collection container past the flange and locks the ball against the seal, thereby impeding movement of the ball in a direction away from the top edge.

6. The apparatus of claim 1, wherein each fluid collection container includes a screw top connector for attaching to the connector ports of the tubing.

7. The apparatus of claim 1, wherein each fluid collection container includes a removable seal on the bottom to allow removal of the fluid.

8. The apparatus of claim 1, wherein at least one of the plurality of fluid collection containers are arranged to collect a beginning portion of the fluid stream.

9. The apparatus of claim 1, wherein at least one of the plurality of fluid collection containers are arranged to collect a mid-portion of the fluid stream.

10. The apparatus of claim 1, wherein at least one of the plurality of fluid collection containers are arranged to collect an end-portion of the fluid stream.

11. The apparatus of claim 1, wherein at least one of the plurality of fluid collection containers are arranged to collect a beginning portion of the fluid stream, a plurality of fluid collection containers are arranged to collect a mid-portion of the fluid stream and a plurality of fluid collection containers are arranged to collect an end-portion of the fluid stream.

12. The apparatus of claim 1, wherein a volume of each of the plurality fluid collection containers collecting a beginning portion of the fluid stream is a first volume, a volume of each of the plurality fluid collection containers collecting a mid-portion of the fluid stream is a second volume and a volume of each of the plurality fluid collection containers collecting an end-portion of the fluid stream is a third volume, wherein the first, second, and third volumes are different from each other.

13. A method of collection of multiple samples of a fluid stream, the method comprising:
   collecting a fluid stream in a plurality fluid collection containers from a tubing having a plurality of connection ports for detachably connecting each of the plurality fluid collection containers, the tubing being held in a housing configured to hold the tubing and the detachably connected fluid collection containers, the housing having a sloped upper surface for receiving the fluid stream and an inlet for directing the fluid stream to the tubing, the plurality fluid collection containers being arranged to receive separate portions of the fluid stream in a temporal sequence;

closing each fluid collection container a seal when filled by a portion of the fluid stream;

causing the fluid stream to flow to the next fluid collection container in the sequence after the previous fluid collection container is filled; and separately collecting at least a beginning portion of the fluid stream, a mid-portion of the fluid stream and an end-portion of the fluid stream in a respective at least one fluid collection container.

14. The method of claim 13, further including locking the top of filled fluid collection containers to prevent fluid from escaping from the top of the fluid collection containers.

15. The method of claim 13, further including collecting a beginning portion of the fluid stream in at least one of the plurality of fluid collection containers, collecting a mid-portion of the fluid stream in at least one of the plurality of fluid collection containers and collecting an end-portion of the fluid stream in at least one of the plurality of fluid collection containers.

16. The method of claim 13, wherein the housing is a fluid collection cup and the tubing is arranged in a spiral within the fluid collection cup such that each fluid collection container is sequentially lower than the previous fluid collection container.

\* \* \* \* \*